March 11, 1958   C. B. WEST, JR   2,826,029
TRACTOR MOWER WITH POWER OPERATED CONTROL MEANS
Filed July 29, 1955   4 Sheets-Sheet 1

INVENTOR.
CHARLES B. WEST, JR.
BY Carlsen & Hayle
ATTORNEYS

March 11, 1958     C. B. WEST, JR     2,826,029
TRACTOR MOWER WITH POWER OPERATED CONTROL MEANS
Filed July 29, 1955     4 Sheets-Sheet 2

INVENTOR.
CHARLES B. WEST, Jr
BY
Carlsen & Hayle
ATTORNEYS

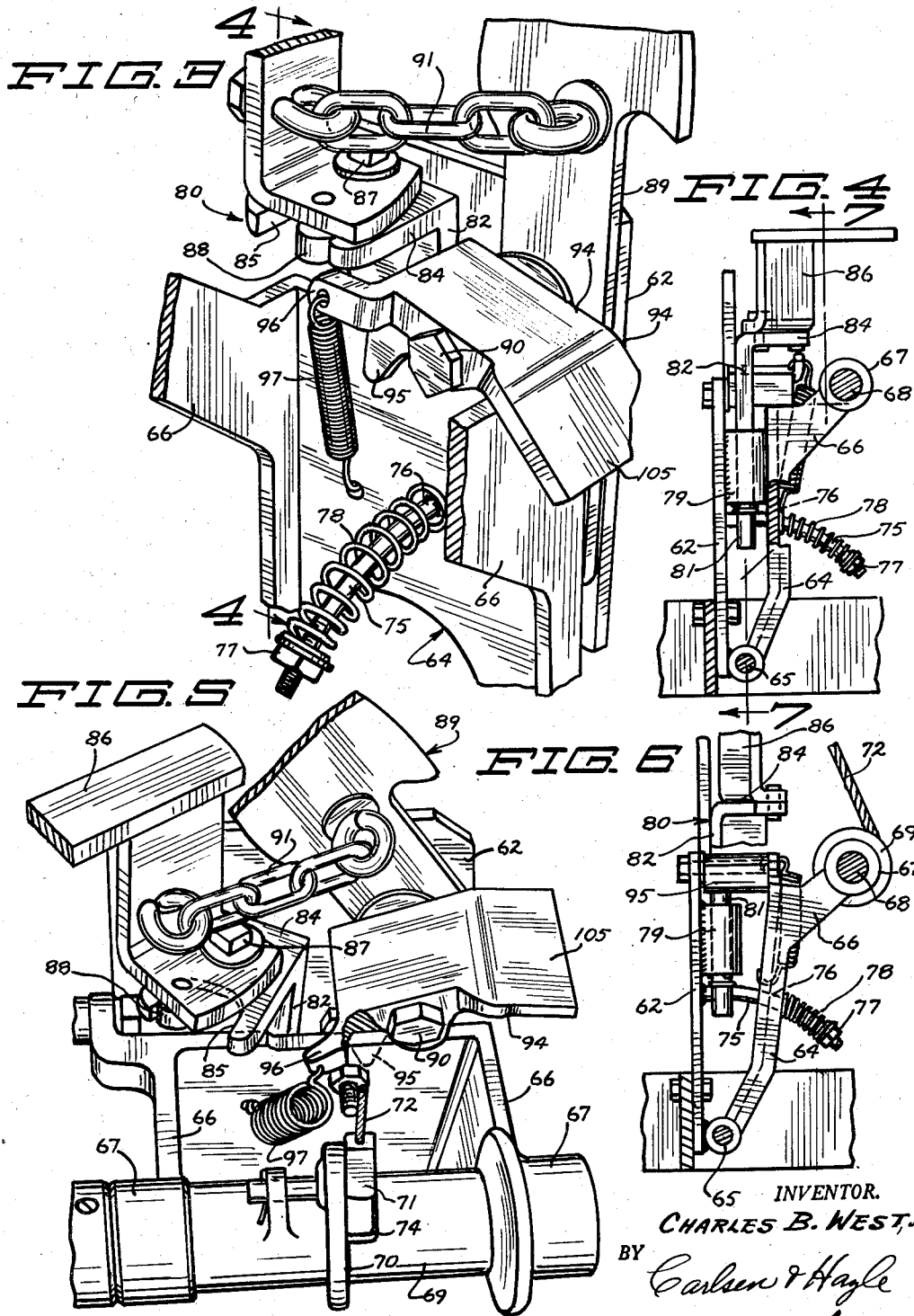

March 11, 1958   C. B. WEST, JR   2,826,029
TRACTOR MOWER WITH POWER OPERATED CONTROL MEANS
Filed July 29, 1955   4 Sheets-Sheet 4
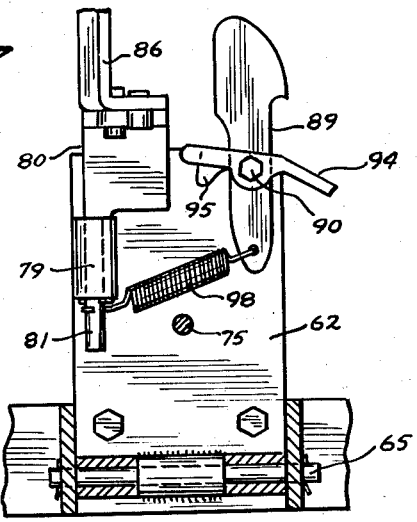
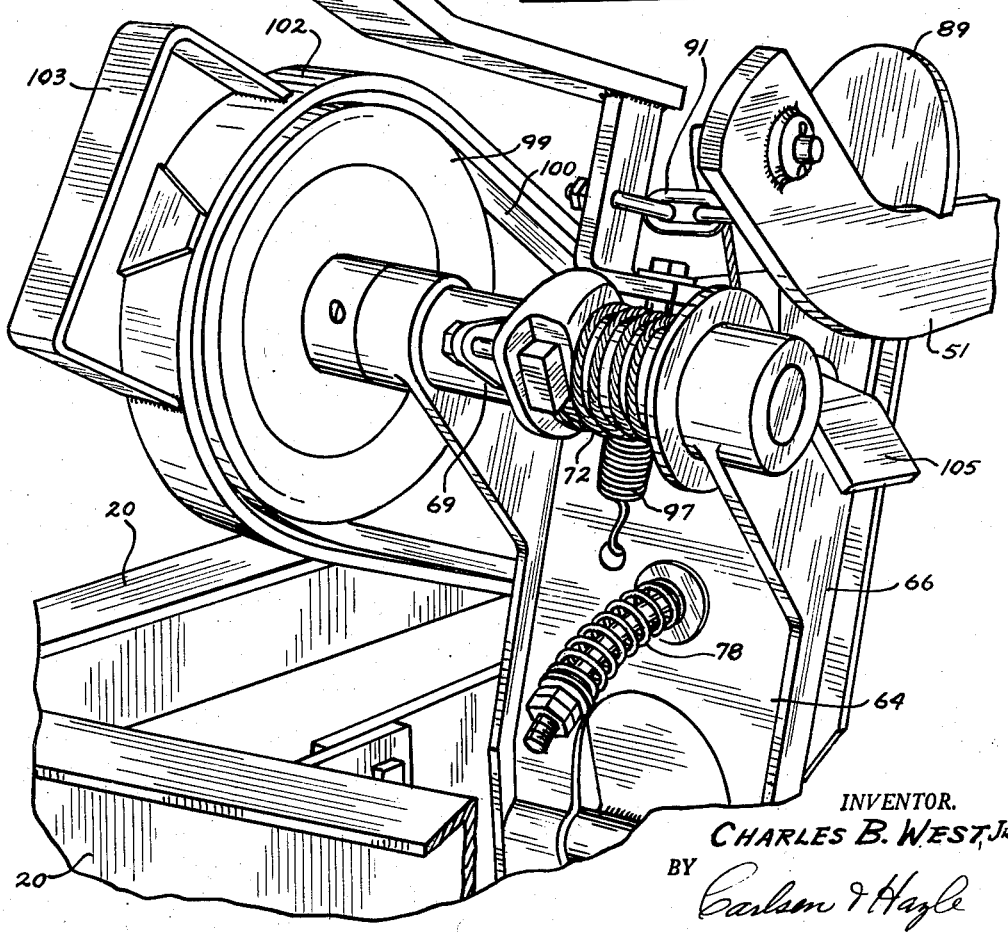
INVENTOR.
CHARLES B. WEST, JR.
BY
Carlsen & Hazle
ATTORNEYS

United States Patent Office 2,826,029
Patented Mar. 11, 1958

2,826,029

TRACTOR MOWER WITH POWER OPERATED CONTROL MEANS

Charles B. West, Jr., Louisville, Ky., assignor to Minneapolis-Moline Company, Hopkins, Minn., a corporation of Minnesota Application July 29, 1955, Serial No. 525,329

10 Claims. (Cl. 56—25)

This invention relates generally to agricultural mowing machines and more particularly to tractor mounted mowers.

Presently used tractor mounted mowers are provided with laterally extending cutter bars which are pivoted at their inner ends for vertical swinging movement between raised inoperative and lowered operating positions. The raising and lowering of the cutter bar has been heretofore generally accomplished either by means of a hand lever having suitable linkage connecting it to the bar or through utilization of the tractor hydraulic system for power operation.

Manual operation is unsatisfactory because it is slow and requires a great deal of effort on the part of the operator. This has become an increasingly greater problem as cutter bars have been increased in length with consequent greater weight. Hydraulic operation is also slow and the necessary connections are very expensive. Furthermore, many tractors are not properly equipped to provide for hydraulic operation of a mower mounted thereon.

Recognizing the shortcomings of the manual and hydraulically powered systems, others in the art such as Wagner in Patent No. 2,204,333, issued June 11, 1940, and Pearson in Patent No. Re. 21,636, issued November 26, 1940, have disclosed mowers wherein the cutter bar is lifted through connection with the tractor power take-off. It is with this type of system that my invention is primarily concerned.

A principal object of the present invention is to provide a tractor mounted mower with an improved cutter bar lifting mechanism.

Another object of the invention is to provide a tractor mounted mower with a new and improved cutter bar raising means powered by the tractor engine, which means is on actuation adapted to quickly raise the bar and automatically and positively lock it in raised position.

Still another object of the invention is to provide a tractor mounted mower with a power operated winch and cable type cutter bar lift mechanism, with the winch being belt driven from the power take-off of the tractor and being movable between driven and idle positions so that its driving belt acts also as a clutch.

Still another object of the invention is to provide a tractor mower with a new and improved cutter bar raising and lowering mechanism, which mechanism includes a safety device for prohibiting accidental lowering of the cutter bar from its raised position.

With these and still additional objects in mind my invention broadly comprises a tractor mounted mower having a laterally extending cutter bar pivoted at its inner end for raising and lowering movement, a lifting lever pivoted to the mower frame and connected to the cutter bar to raise the bar as the lever is swung inwardly and lower the bar as the lever is swung outwardly about its pivot, a winch mechanism on the mower, a cable having one end wound on the winch mechanism and its other end connected to the lifting lever, means providing a driving connection between the power take-off of the tractor to the winch mechanism for operating said mechanism, and a manual control for selectively engaging and disengaging said driving connection.

The above mentioned and still additional objects of the invention will be brought to light during the course of the following specification, reference being made to the accompanying drawing, in which—

Fig. 3 is an enlarged fragmentary perspective view of the mechanism for effecting the driving connection between the power take-off and winch, and showing the mechanism in drive disengaged position.

Fig. 4 is a side elevation on a reduced scale taken on line 4—4 of Fig. 3.

Fig. 5 is a perspective view similar to Fig. 3 but shows the mechanism in winch drive engaging position.

Fig. 6 is a side elevation of the mechanism in the position shown in Fig. 5.

Fig. 7 is a vertical section taken on line 7—7 of Fig. 4.

Fig. 8 is an enlarged perspective view of the cutter bar raising and lowering device with the lever arm locked in bar raising position.

Figure 1:
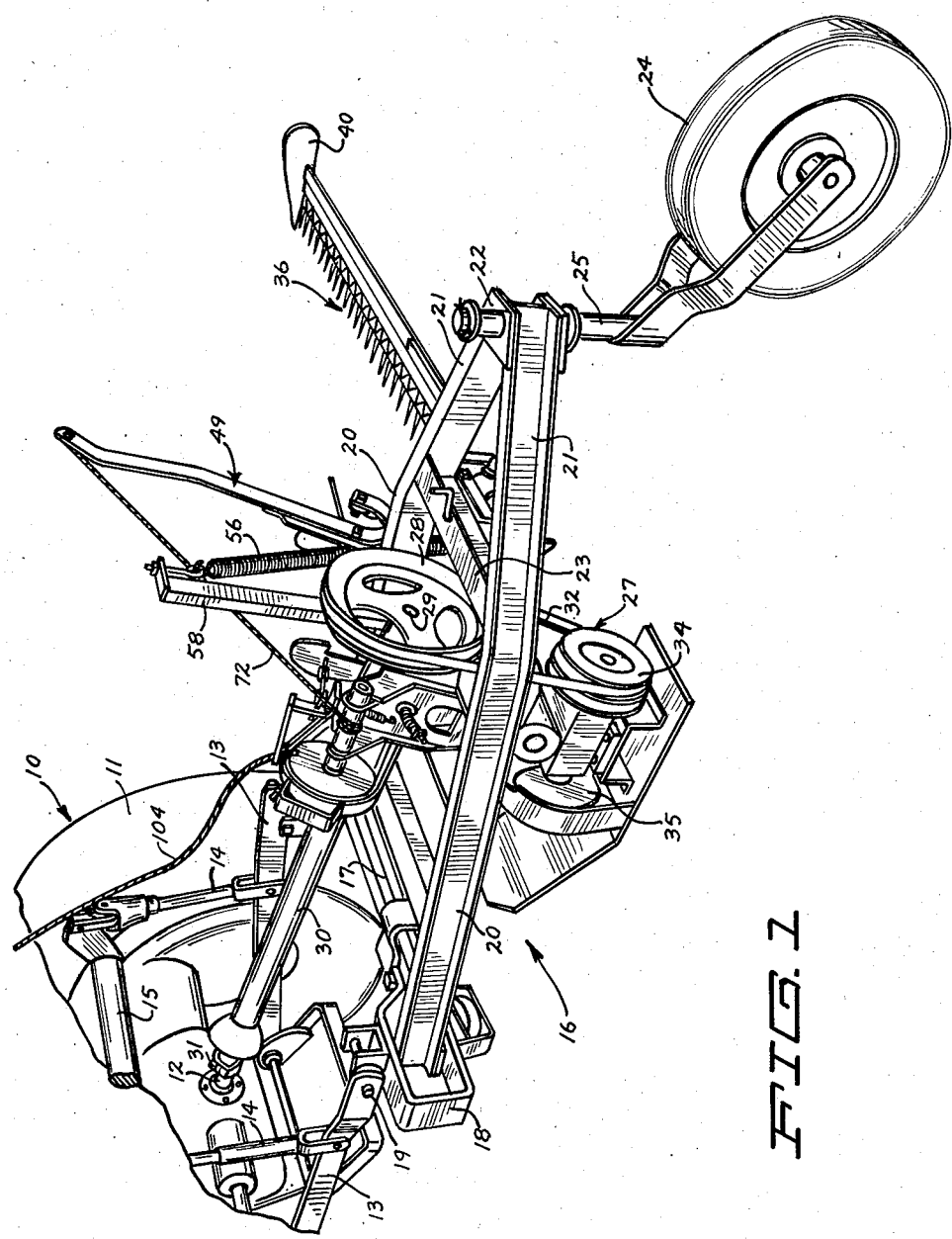
Fig. 1 is a perspective view of my improved mower mounted on a tractor and with the cutter bar in lowered or operating position.

Referring now more particularly to the drawing reference numerals will be used to describe like parts and structural features in the different views. Attention is directed first to Fig. 1 which is a perspective view of the entire mower shown mounted in pull-behind position on the rear end of a tractor. The tractor is designated generally at 10 and has conventional rear traction wheels 11 and power take-off shaft 12. The tractor is provided with an implement draft device comprising side bars 13 which are pivotally connected to opposing forward points on the tractor chassis and link members 14 which connect the bars 13 to a power operated rock shaft 15 on the tractor for raising or lowering the bars about their forward pivots.

The mower is designated generally at 16 and has a frame including a forward cross beam 17 which has its end portions 18 pivotally connected as at 19 with the rear ends of the bars 13 for raising and lowering of the frame about a transverse horizontal axis. The frame has side beams 20 extending rearwardly from beam 17 with the rear portions 21 converging in their rearward extension and being integrally connected at their rear ends as by gusset plates 22. A cross member 23 interconnects the beams 20 to rigidify the frame. A caster wheel 24 is carried at the rear end of the frame, the shaft 25 thereof being suitably journaled in the frame for rotation on a generally vertical axis.

The connection between beams 20 and the cross beam 17 is the spring releasable type with the beams 20 being releasable for swinging of the frame sidewardly when the mower cutter bar strikes an obstacle. The mower frame connection however does not form any part of the present invention.

A power transmission for driving the mower mechanism is mounted on the frame and is here designated generally at 27. It includes a drive pulley 28 mounted on a shaft 29 which extends forwardly within the shield 30 for connection through the universal joint 31 with the power take-off shaft 12 of the tractor. Pulley 28 is connected by V-belt 32 with a pulley 34 mounted concentrically with a pitman flywheel 35 which is suitably connected with the cutter bar 36 to reciprocate the same in conventional manner.

Figure 2:
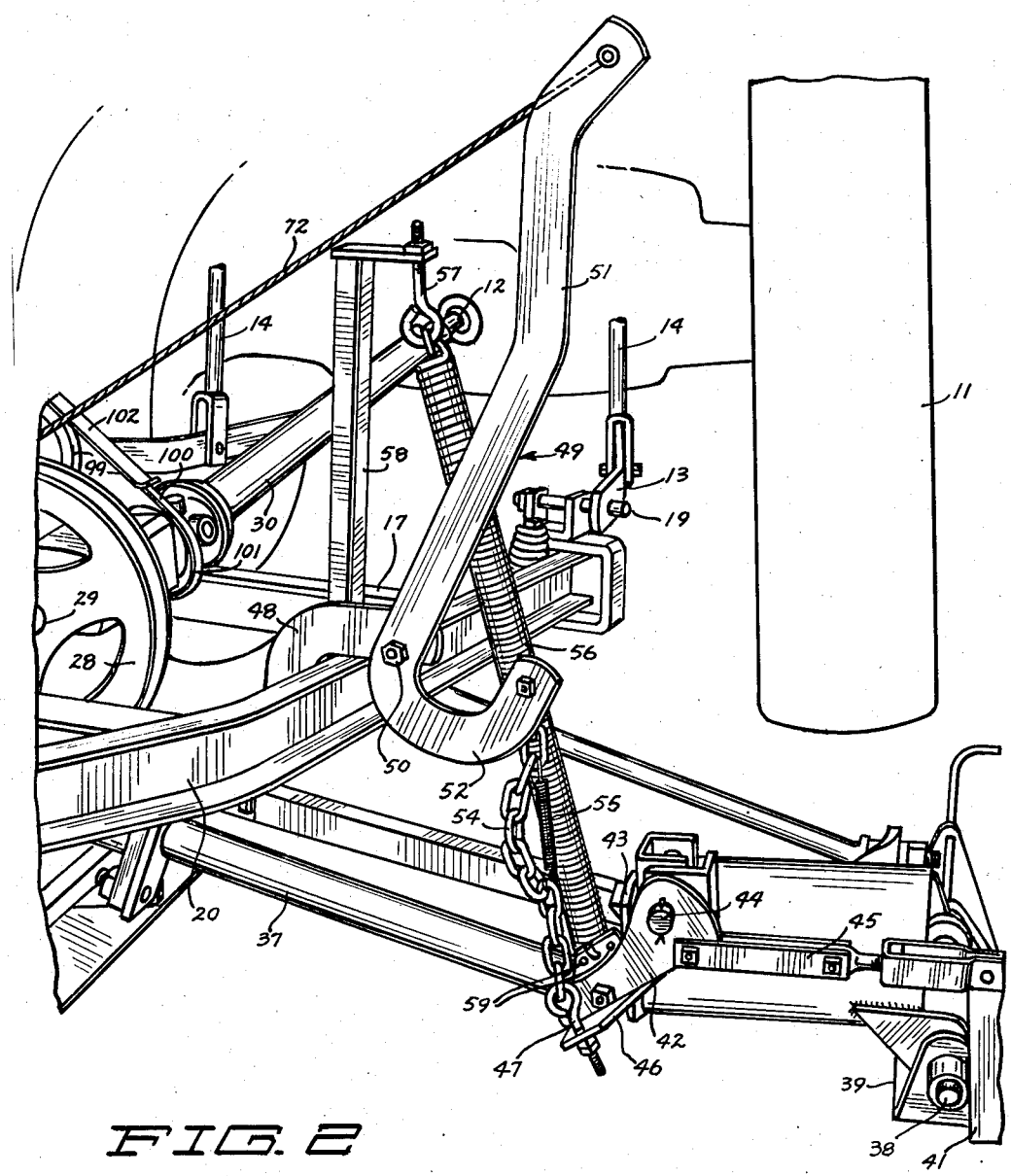
Fig. 2 is an enlarged fragmentary perspective showing the lifting lever and its connection to the cutter bar.

A coupling bar 37 (Fig. 2) which extends transversely beneath the frame has its left end pivotally associated with the frame for raising and lowering of the bar. This pivotal connection is of conventional construction and is clearly shown in Reissue Patent No. 21,819 to Korsmo, dated June 3, 1941. At its extended end the bar is pivoted as at 38 to the mowing arm which includes the cutter bar 36 and inner and outer shoes 39 and 40. Lifting arm 41 is mounted in upright position on the mowing arm. A rocker arm 42 is pivotally mounted as at 44 on the coupling bar 37 and is connected at one side of its pivot as by length adjustable linkage 45 with the upper end of the lifting arm 41.

The free end of rocker member 42 is bolted to an L-shaped plate 46 which carries eye bolt 47. It will thus be understood that if upward pull is exerted upon the bolt 47 crank arm 42 will be swung about its pivot 44 to exert inward pull upon the upper end of arm 41 to raise the cutter bar 36 about the axis of pivot 38. There is a suitable stop such as the member designated at 43 to obstruct movement of the arm 42 when the outer end of the cutter bar has been raised to a certain point. Continued upward pull on the eye 47 will then swing the entire cutter bar and its supporting coupling bar 37 about the pivotal connection of bar 37 at the left side of the frame.

As thus far described the mower is of rather conventional construction, there generally being a hand lever or hydraulic controls for effecting the desired upward pull on the inner end of crank arm 42. My improved means for facilitating this operation through connection with the tractor power take-off shaft 12 will now be described in detail. Continuing the reference to Figs. 1 and 2 it will be noted that a bracket 48 is mounted to extend laterally from the right side beam 20. An elongated lever arm denoted generally at 49 is pivoted as at 50 to the bracket 48. This arm has a relatively straight portion 51 extending upwardly substantially above the pivot and a bottom hook 52 extending from below the pivot. A link chain 54 connects the hooked end 52 of the arm 49 to the eye 47. The chain slack is taken up by the chain spring 55 to keep the chain from flopping when the mower is in use.

A helper spring is provided to assist the lever 51 in raising the mower assembly. This spring is an elongated spiral spring, designated generally by the number 56. The spring connects the eye 57 fastened to the upper end of hanger 58 mounted on the frame and the L-shaped lift crank clip 46. Clip 46 is provided with a series of apertures 59 through one of which the end loop of the spring 56 is hooked. The different apertures 59 are to allow adjustment of the effect of the spring.

The means of swinging the lever 49 inwardly about its pivot 50 will now be described, and in this connection the reference will be mainly to the structure shown in detail in Figs. 3 through 8 inclusive. A base plate 62 is rigidly mounted on the mower frame to extend upwardly along and beside the rotary drive shaft 29 which extends rearwardly from the power take-off. The plate which is best shown in Figs. 4 and 6 lies on a longitudinal vertical plane at the left side of the drive shaft 29. The left face of the plate will be referred to as the front face thereof.

A front hinge plate is designated generally by the number 64. This plate is disposed in spaced relation to the stationary plate and parallel thereto (Fig. 4) and the two plates are hingedly connected along their bottom edges on hinge pin 65. Accordingly, plate 64 may be swung toward or away from plate 62 about the axis of pin 65. Plate 64 has integrally formed therewith a pair of bracket arms 66 which extend outwardly from the upper portion of the plate and carry axially aligned bearing sleeves 67. Each sleeve is lined internally with a shaft bearing (not shown) to jointly support for rotation therebetween a shaft 68 which carries a drum or spool 69. The spool has an integral band 70 around its center to which the terminal member 71 on lift cable 72 is pivotally attached. The drum is recessed as at 74 so that the member 71 may swing to an out of the way position.

The stationary plate 62 has an arcuate stud 75 rigidly mounted to extend forwardly from the front face thereof through an aperture 76 which is provided in the hinge plate 64. Stud 75 is curved to extend along an arc the center of which is the axis of pin 65 so that it does not interfere with the opening and closing movement of the hinge plate. A nut 77 is threaded upon the end of stud 75 and a spiral spring 78 is disposed around the stud between the nut 77 and plate 64 in such a manner as to yieldably urge the plate 64 toward the stationary plate 62.

The means for moving plate 64 and spool 69 away from plate 62 and against the compression force of spring 78 will now be explained. A tubular hinge sleeve 79 is integrally mounted in vertical position on the front face of plate 62 and near the forward edge thereof. An L-shaped wedge member, designated generally at 80, has a rod-like shank 81 extending downwardly for rotation in the sleeve 79 so that the back plate 82 of the wedge may be swung between a collapsed position lying flat against plate 62 (Figs. 3 and 4) and an extended position at an angle to the plate (Figs. 5 and 6). The upper end portion of the member 80 extends outwardly at right angles to the plate 82 as at 84. This portion 84 is cut away as shown at 85 along its extended edge.

The number 86 designates a handle or control for operating the wedge member 80. This handle extends crosswise of the mower frame and is pivotally connected by bolt 87 to the top portion 84 of the wedge member 80. A wedge actuating member 88 projects downwardly from member 86 into the recess 85 and is allowed limited play therein.

Near its rear edge the plate 62 also has pivotally mounted thereon a catch plate, designated generally at 89. This plate is pivoted near its longitudinal center on bolt 90 for oscillating movement on a transverse axis. A flexible chain 91 connects the catch member 89 to an eye mounted on the handle and offset laterally from the turning axis of shank 81 whereby when the handle is turned from its position in Fig. 3 first about the axis of bolt 87 and then with the wedge member 82 about the axis of shank 81 to the position shown in Fig. 5 the catch 89 will be swung by chain 91 about bolt 90 from its upright position to a forwardly tilted condition.

As handle 86 is operated to swing the catch plate 89 forwardly the member 88 moves against the forward wall of the notch 85 to swing the wedge member 80 outward to the position shown in Figs. 5 and 6.

Bolt 90 carries a latch plate 94 which has a spacer projection 95 extending along its entire lower forward edge. An ear 96 on the plate 94 is connected by the latch spring 97 to a point therebelow on plate 64. It will accordingly be understood that as handle 86 is actuated to swing the wedge member 80 outwardly to force plate 64 away from plate 62, the upper edge of plate 64 will move along and past the projection 95 and the spring 97 will pull the latch plate 94 downwardly about its pivot so that projection 95 will be disposed between the plate 62 and 64 so as to hold them in separated condition against the compressive force of spring 78.

Catch plate 89 is also spring biased and for this construction attention is called to Fig. 7. The spring 98 connects the lower end of the plate to the wedge plate spindle 81.

Attention is now directed primarily to Fig. 8 of the drawings. At its forward end the shaft 68 carries a pulley 99. This pulley is driven by belt 100 from the drive pulley 101 (Fig. 2) mounted on the drive shaft 29. A guard 102 covers the pulley 99 and belt 100 and is provided with a handle 103. The guard 102 is journaled on the shaft 68 to move with the plate 64. It will be understood that the pulleys 99 and 101 are so spaced apart as to leave the belt 100 slack when the mechanism is in the condition shown in Figs. 3 and 4. However, when the pulley 99 is in its outer position as when plate 64 is swung outwardly as in Figs. 5 and 6, the belt 100 is pulled tight and there is a driving connection between the two pulleys.

Operation of the invention will now be described. When the mower is being operated the cutter bar 36 is in lowered cutting position as shown in Fig. 1 with the sickle bar being driven from the power take-off through shaft 29 and the driving mechanism designated generally at 27. While the mower is operating the cutter bar lifting mechanism is in the condition shown in Figs. 3 and 4 with belt 100 loose so that the pulley 99 and its associated winch spool 69 are idle, with cable 72 unwound therefrom. Handle 86 is in laterally extending position.

If it is now desired to raise the cutter bar the tractor operator exerts a firm pull on the rope 104 which is connected to the extended end of the handle 86. This causes the wedge member 80 to move the plate 64 outwardly on its hinge axis 65 and member 94 latches the plate in its open position (Figs. 5 and 6). As plate 64 which carries winch 69 and pulley wheel 99 moves to its outer position the belt 100 tightens to provide a driving connection between the driving pulley 101 and the pulley 99 to rotate the latter. The winch drum 69 is driven with pulley 99 and cable 72 winds upon the drum. As the cable is wound lever arm 49 is swung inwardly about its pivot 50 and the member 46 is pulled upwardly by chain 54 to raise the cutter bar as hereinbefore described.

As the lever arm 49 is being pulled inwardly the members 89 and 94 are in the positions shown in Fig. 5. The upright portion 51 of the lever arm is in transverse alignment with a contact portion 105 of the member 94 so as to move downwardly thereagainst as the cable is completely wound in. As the arm portion 51 presses downwardly upon the member 94 the latter is swung about its transverse axis 90 so that the spacer portion 95 thereof is withdrawn upwardly from between plates 62 and 64. This allows the plate 64 to return to its inner position (Figs. 3 and 4) under action of spring 78. As this takes place the members 80 and 86 return to their original positions and spring 98 causes the catch member 89 to swing rearwardly and engage over the lever arm 49. With the lever arm locked the cutter bar is of course positively retained in its raised position. It will, of course, be understood that winch 69 has become idle immediately upon the inward collapse of plate 64.

If it is now desired to again lower the cutter bar rope 104 is pulled slightly to swing handle 86 forwardly a sufficient amount to release the lever arm from catch 89. The cutter bar will then gravitationally return to operating position as cable 72 unwinds from the idle winch drum 69. It will be observed that through the connection at 88, 85 the handle 86 is allowed to swing forwardly a limited distance before it has any effect on the wedge plate 80. Thus catch 89 is pulled by chain 91 to a lever arm releasing position without noticeably affecting the position of plate 64. It will accordingly be understood that only a slight momentary pull should be exerted upon the rope 104 to lower the lever arm.

A safety has been provided to prohibit lowering of the cutter bar when the mower is not running. This is embodied in the assembly by providing for a manual movement of plate 64 to its locked outer position through pulling handle 103. It will be understood that when the mechanism is in the position shown in Fig. 8 pulley wheel 99 and winch 69 are in idle or free condition. By pulling handle 103, plate 64 may be swung outwardly to its open position where it is locked by the latch member 94. This tightens belt 100 causing it to lock pulley wheel 99 and the cable drum and lever arm 51 cannot then be released until the mower is started. After the power shaft is started the safety will then automatically be released and the mower may be lowered to its operative position in the manner hereinbefore described.

Belt 100 not only serves as a drive means for the winch drum 69 but also serves as a clutch in the arrangement disclosed. The drive means is engaged only by swinging the plate or support 64 about its hinge pin 65 to its outer position. The raising operation is thus powered directly from the shaft driven by the tractor power take-off. The mower thus economically and effectively carries out the aforementioned objectives.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a mowing machine, a tractor having a power take-off, a mower frame mounted to extend rearwardly from the tractor, a cutter bar extending laterally from the frame and pivoted thereto for raising and lowering movement, a mower drive shaft on the frame having one end connected to the power take-off, said shaft being operatively connected to the cutter bar for operating the same, a winch support mounted on the frame, a rotary drum mounted on the support and carrying a pulley wheel at one end, a driving pulley wheel on the shaft, a belt extending loosely around the two pulley wheels, belt tightening means supported by the frame for tightening the belt to provide a driving connection between said wheels, a cable having one end wound on the winch, and means connecting the other end of the cable to the cutter bar.

2. In a mowing machine, a tractor having a power take-off, a mower frame mounted to extend rearwardly from the tractor, a cutter bar extending laterally from the frame and pivoted thereto for raising and lowering movement, a mower drive shaft on the frame having one end connected to the power take-off, said shaft being operatively connected to the cutter bar for operating the same, a winch support mounted on the frame, a rotary drum mounted on the support and carrying a pulley wheel at one end, a driving pulley wheel on the shaft, a belt extending loosely around the two pulley wheels, means supported by the frame for tightening the belt to provide a driving connection between said wheels, a cable having one end wound on the winch, means connecting the other end of the cable to the cutter bar, and a releasable latch device on the belt tightening means for retaining the belt tightening means operative while the cable is wound upon the drum.

3. In a mowing machine, a tractor having a power take-off, a mower frame mounted to extend rearwardly from the tractor, a cutter bar extending laterally from the frame and pivoted thereto for raising and lowering movement, a mower drive shaft on the frame having one end connected to the power take-off, said shaft being operatively connected to the cutter bar for operating the same, a winch support mounted on the frame, a rotary drum mounted on the support and carrying a pulley wheel at one end, a driving pulley wheel on the shaft, a belt extending loosely around the two pulley wheels, belt tightening means supported by the frame for tightening the belt to provide a driving connection between said wheels, a cable having one end wound on the winch, means connecting the other end of the cable to the cutter bar, a releasable latch device on the belt tightening means for retaining the belt tightening means operative while the cable is wound upon the drum, and said latch device having a manual control extending to the tractor operator's position.

4. In a tractor mower, a main frame, a cutter unit swingably mounted on the frame for movement between raised and lowered positions, a rotatable shaft mounted on the frame and adapted for connection with a power source for rotation thereby, a pulley on the shaft, a drum frame pivoted on the main frame, a rotary drum on the drum frame, a second pulley on the drum frame and arranged in axial alignment with the drum and in driving association therewith, a drive belt extending around both pulleys, and means on the main frame for controlling the position of the drum frame on its pivot to selectively tighten or slacken said belt about the pulleys to respectively create or eliminate a driving connection therebetween, and a cable having one end portion wound on the drum and its other end connected to the cutter unit.

5. In a mowing device, a main frame, a cutter bar extending laterally from the frame and having its inner end pivoted thereto for raising and lowering of the bar, an upright lever arm connected to the cutter bar, a drive pulley rotatably mounted on the frame and adapted to be connected to a power source for rotation thereby, an auxiliary frame hingedly mounted on the main frame, a rotary spool mounted on the auxiliary frame and having a driven pulley integrally associated therewith, a cable having one end connected to the lever arm and its other end connected to the spool, a drive belt extending around the two pulleys, control means for swinging the auxiliary frame about its hinge axis to selectively tighten or slacken the belt, and locking means on the main frame adapted to automatically engage and lock the auxiliary frame when it is swung to a belt tightening position.

6. In a mower, a frame, a cutter bar extending laterally from the frame and having its inner end pivoted thereto for vertical swinging movement of the bar between raised and lowered positions, an upright lever arm connected to the cutter bar for moving the bar about its pivot, a rotatable winch drum mounted on the frame, a cable having one end portion wound on the winch drum and its other end connected to the upper end of the lever arm, control means for selectively powering or idling the drum, said control means including a latch member adapted to lock the drum in power driven position until displaced, and said latch member being located in the path of movement of the lever arm to be displaced thereby as the cable is wound upon the drum.

7. A tractor mounted and operated mower comprising, in combination with a tractor having a power take-off, a frame mounted on the tractor, a rotatable drive means mounted on the frame and having connection with the tractor power take-off to be driven thereby, a rotatable winch device pivotally mounted on the frame for swinging movement toward and away from the drive means, a drive belt connecting the winch device to the drive means, control means on the winch device for swinging the device about its pivot to tighten or loosen said belt to selectively provide a driving connection between the drive means and winch device, a cutter bar pivotally connected to the frame for raising and lowering movement, a lever member connected to the cutter bar, and a cable having one end portion wound on the winch device and the other end connected to the lever member.

8. In a mowing device, a frame adapted to be connected to a draft vehicle for movement therewith, a cutter bar extending laterally from the frame and having its inner end pivoted thereto for vertical swinging movement of the bar between raised and lowered positions, an upright lever arm pivoted to the frame on a longitudinally extending axis and having connection with the cutter bar to respectively raise and lower the cutter bar as the lever is swung inwardly and outwardly with respect to the frame, a rotatable drive shaft mounted on the frame and adapted for connection to a power source, a pulley on the shaft, a winch drum mounted for rotation on the frame and carrying a second pulley, a flexible element having one end connected to the lever arm and its other end wound on the winch drum, a drive belt extending around the two pulleys, a belt tightening means on the frame for applying tension to the belt to provide a driving connection between the pulleys, said belt tightening means including a pivoted latch plate adapted to lock the means in belt tensioning condition until displaced, and said latch plate being located in the path of inward movement of the lever arm to be displaced thereby when the lever arm is swung inward to raise the cutter bar.

9. The subject matter of claim 8 wherein a second latch member is mounted on the frame in the path of inward movement of the lever arm for engaging and locking the lever arm against return outward movement when the latch plate is displaced.

10. In a mowing machine adapted to be mounted on a tractor having a power take-off, a frame mountable on the tractor, a cutter bar extending laterally from the frame and pivoted thereto for raising and lowering movement, rotary drive means mounted on the frame adapted to be driven from the power take-off, a rotary drum mounted on the frame, a pair of pulleys mounted one on the drive means and one on the drum, a belt trained loosely around both pulleys, belt tightening means on the frame for tightening the belt around the pulleys to provide a driving connection between the drive means and drum, an elongated flexible member having one end wound on the drum, and means connecting the other end of the flexible member to the cutter bar.

References Cited in the file of this patent

UNITED STATES PATENTS

| | | |
|---|---|---|
| 2,166,967 | Raney et al. | July 25, 1939 |
| 2,204,333 | Wagner | June 11, 1940 |
| 2,314,216 | Hilblom | Mar. 16, 1943 |
| 2,617,242 | Iverson | Nov. 11, 1952 |
| 2,686,658 | Hill et al. | Aug. 17, 1954 |
| 2,757,504 | Elfes et al. | Aug. 7, 1956 |